Sept. 13, 1960
C. A. SHERMAN
2,952,204
METHOD AND MEANS FOR MARKING ARTICLES
AND FOR PROCESSING MARKED ARTICLES
Filed Dec. 11, 1957
5 Sheets-Sheet 2
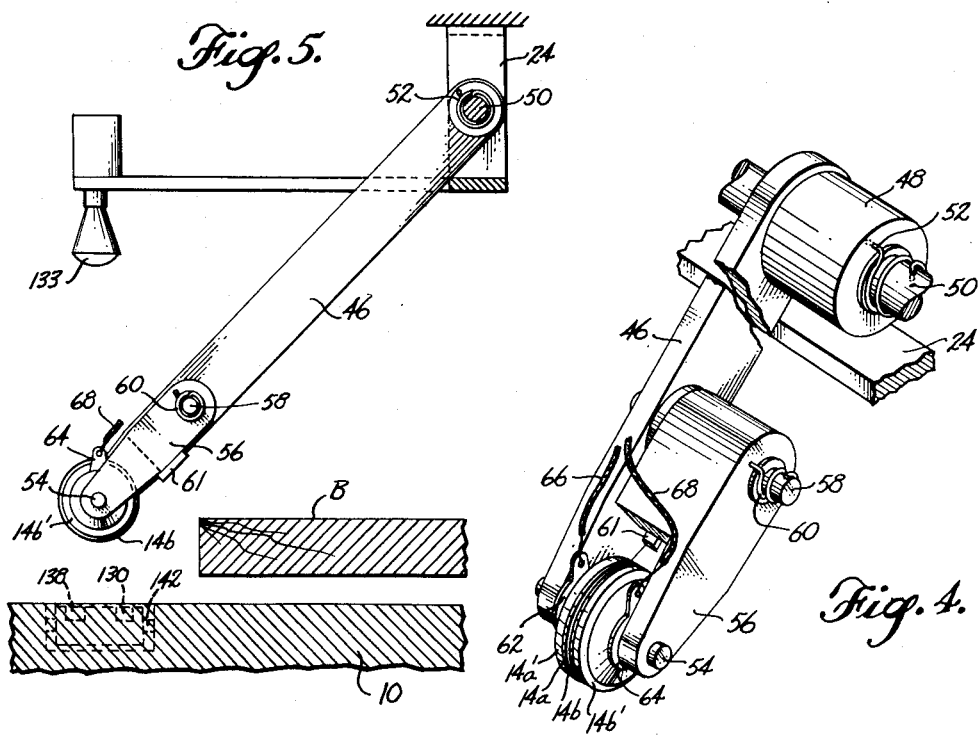
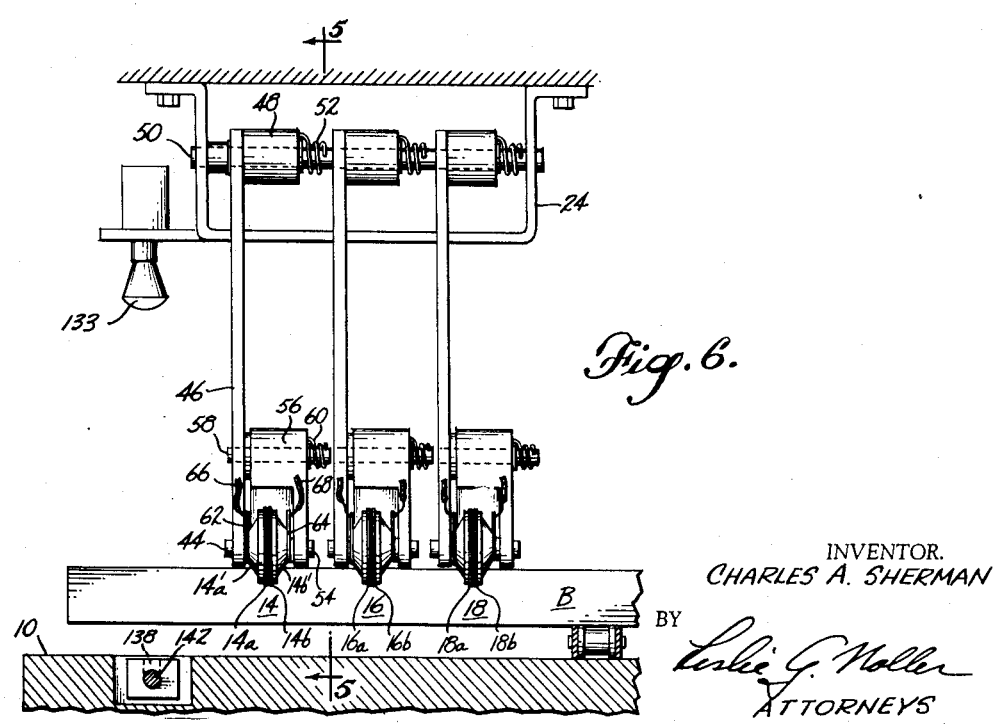
INVENTOR.
CHARLES A. SHERMAN
BY
Leslie G. Noller
ATTORNEYS

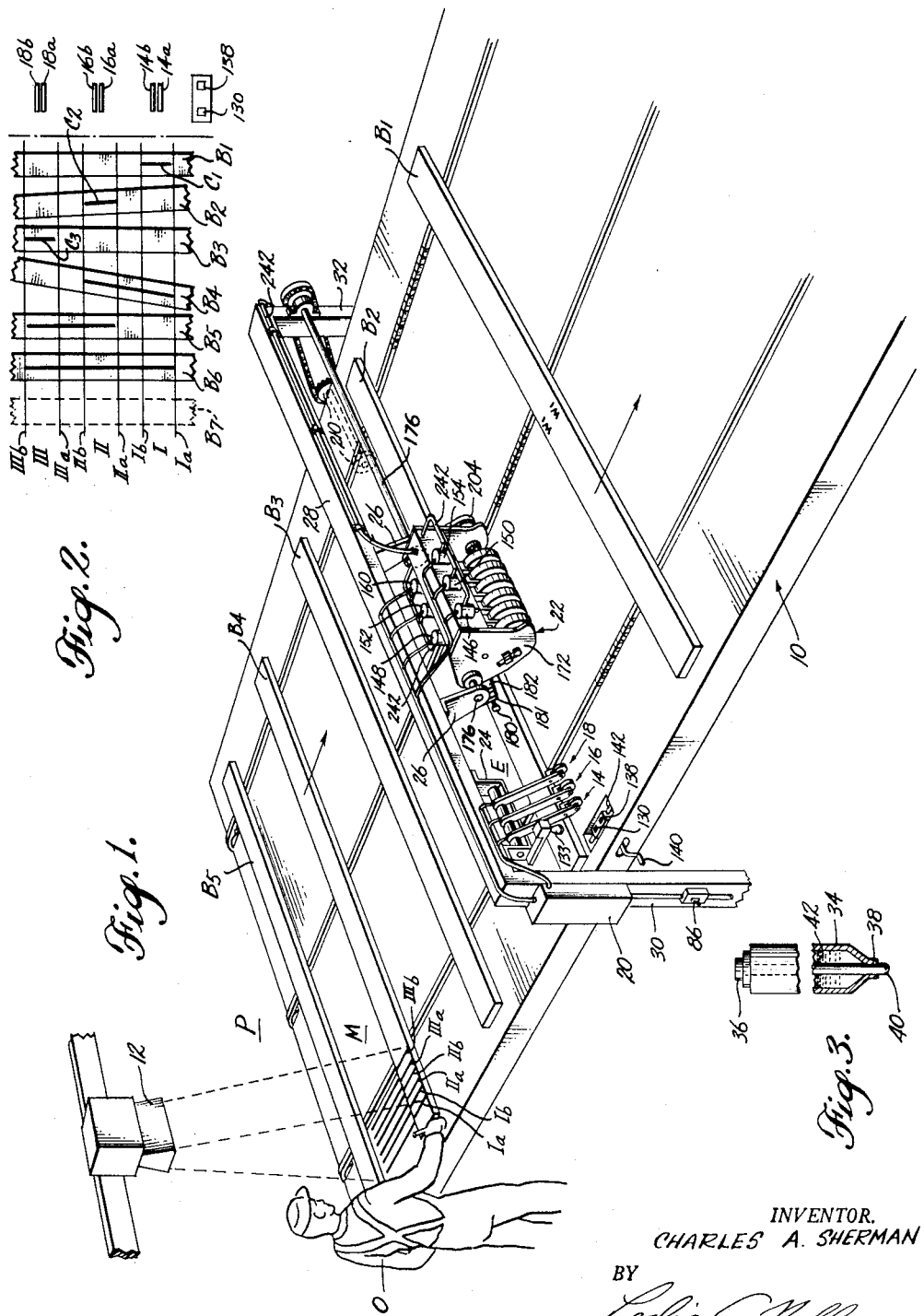

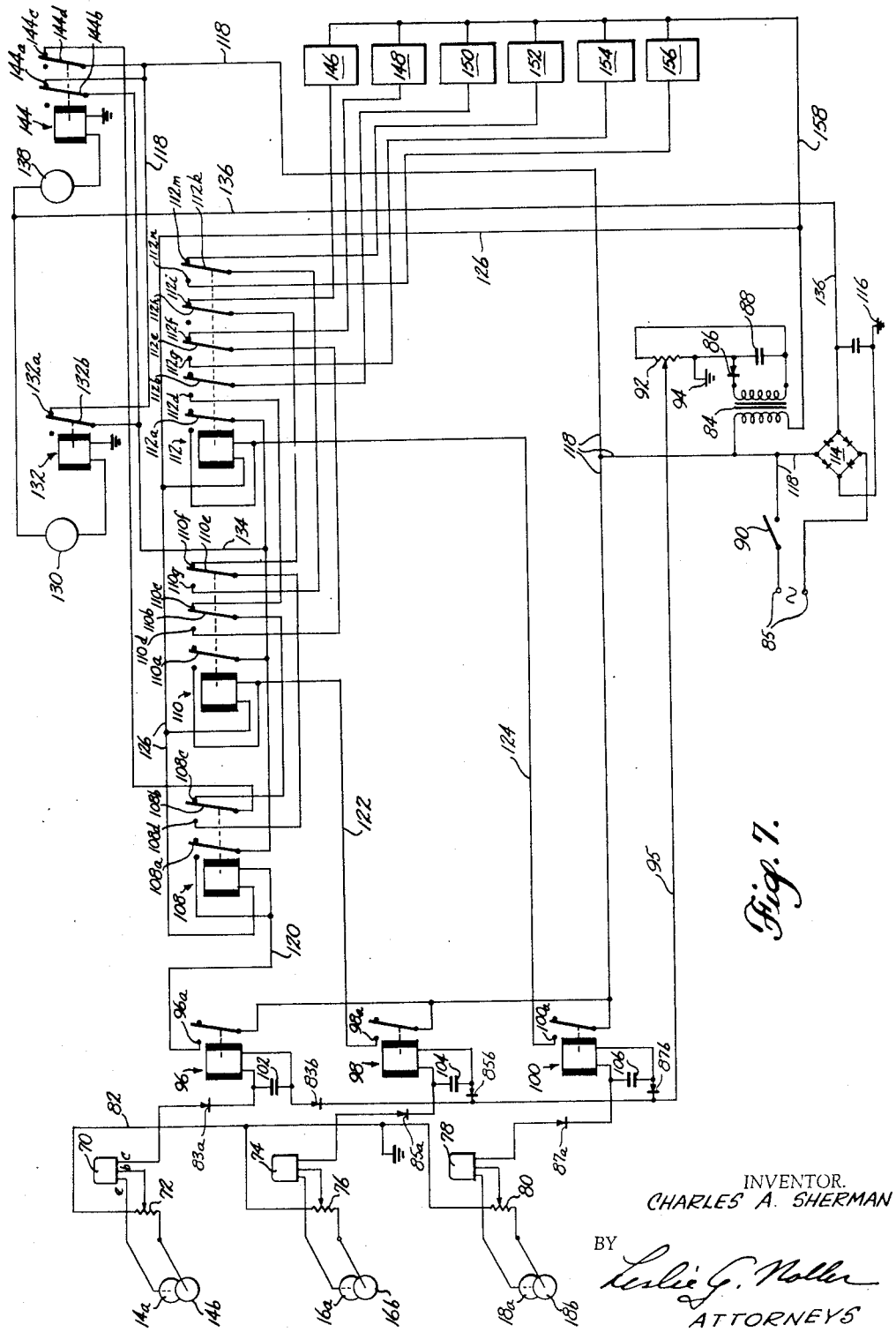

Sept. 13, 1960 C. A. SHERMAN 2,952,204
METHOD AND MEANS FOR MARKING ARTICLES
AND FOR PROCESSING MARKED ARTICLES
Filed Dec. 11, 1957 5 Sheets-Sheet 4

INVENTOR.
CHARLES A. SHERMAN
BY
ATTORNEYS

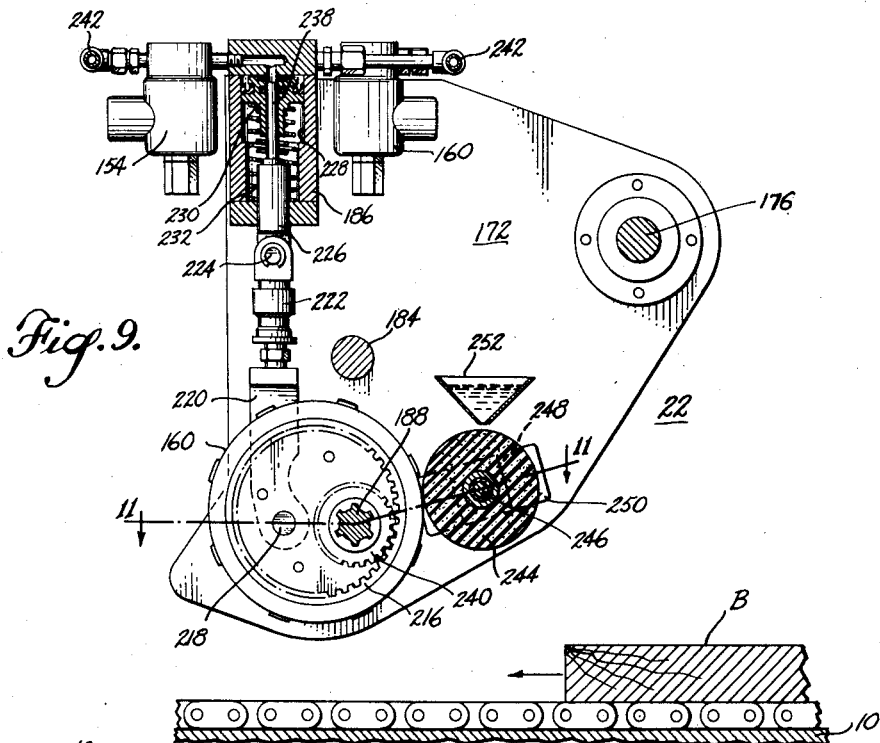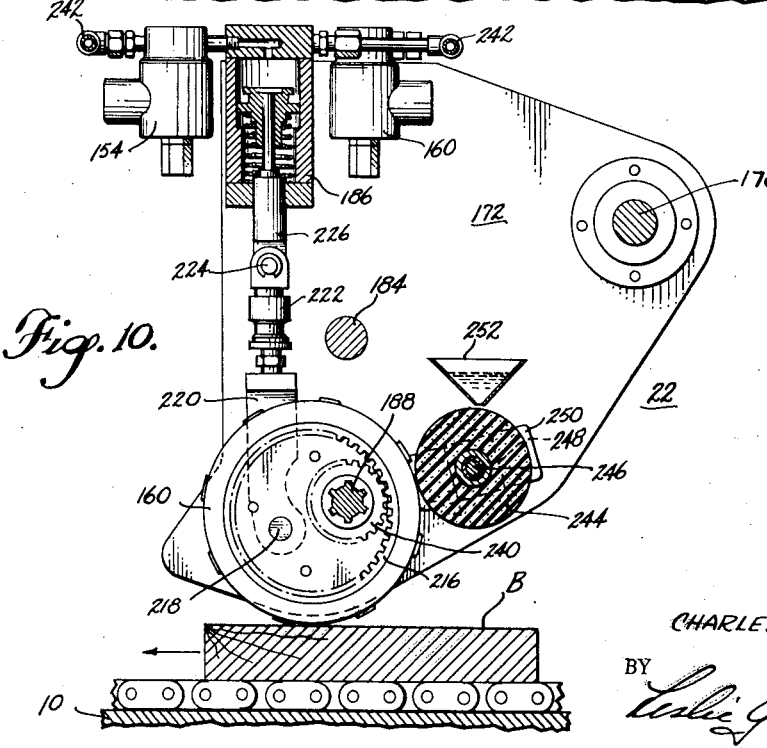

United States Patent Office 2,952,204
Patented Sept. 13, 1960

2,952,204

METHOD AND MEANS FOR MARKING ARTICLES AND FOR PROCESSING MARKED ARTICLES

Charles A. Sherman, Tacoma, Wash., assignor to Weyerhaeuser Company, Tacoma, Wash., a corporation of Washington Filed Dec. 11, 1957, Ser. No. 702,168

17 Claims. (Cl. 101—35)

This invention relates to an improved method and apparatus for the marking of articles and for the processing of articles so marked. As herein disclosed the invention concerns the grade stamping of lumber in accordance with identifying marks previously applied thereto, and includes an improved technique for code-marking articles and thereafter automatically selecting or identifying the individual articles on the basis of the code marks applied thereto for purposes of grade stamping or otherwise selectively treating or handling such articles. The invention is herein illustratively described by reference to the presently preferred form thereof; however, it will be recognized that certain modifications and changes therein with respect to details may be made within the scope of the patentable contribution to the arts represented thereby.

The operating requirements of modern sawmills include an efficient board grading and grade stamping technique. Customarily finished boards emerging from the final planer or shaper are deposited on a flat conveyor which transports them in successive order to a disposal station where they are sorted for shipment and sale according to grade. While advancing on this conveyor the boards are visually inspected and stamped for grade or quality. With former methods grade stamping normally required two human operators, one to judge the grade and code mark each board and another to interpret the code markings and operate a grade stamper applying a permanently legible grade indication. At normal production rates one person alone could not judge the grade of each board and also directly operate a stamping device without making mistakes or tiring quickly.

A broad object of this invention in its application to lumber grading or the like is to provide a successful and practicable method and apparatus by which the grading and permanent grade stamping operations associated with the production carried by one conveyor may be performed by one person with ease and reliable accuracy. With the novel method and apparatus that one person need be employed only for judging the grade of the boards and applying temporary grade-indicating code marks thereto. Associated automatic apparatus stationed down the conveyor line from the operator station senses these code marks, interprets them and applies the correct grade stamp to each individual board on the basis thereof.

A related object is to provide a convenient and consistently reliable temporary grade code marking method and a consistently reliable code mark sensing and permanent grade stamping apparatus selectively responsive to such code marks. In achieving this objective it is important that normal differences in the orientation of boards in relation to the line of conveyance and unavoidable differences in the manner in which the operator draws the code marks on the boards have no adverse effect on the results.

A highly important object of the invention is such a method and associated apparatus employing a unique code mark applying and sensing technique which enables the marks to be consistently distinguished from natural markings or other surface characteristics of the boards, thereby to avoid false and inaccurate operation of the grade stamping device. Such technique is also useful in other article marking and related identifying operations such as pre-marking veneer strips for cutting into lengths and to sever defective material on the basis of the locations of the marks sensed by clipper-actuating control apparatus.

It is also an object to provide such a technique, including a method and related apparatus, which is simple and relatively inexpensive and which permits applying the code marks directly to the boards themselves, thereby obviating the complexities of special devices or identification elements required to move with the boards to carry the identifying information pertaining to each. A specific object is a marking technique and associated identifying apparatus in which the marks themselves are invisible and remain so, thereby avoiding marring the appearance of finished lumber. Another object is the provision of novel and effective electrical pickup means by which the code marks applied to the lumber may be detected electrically for operating the stamping device or other apparatus. A related object is the provision of such electrical pickup means adapted to operate reliably with boards of different shapes, sizes and surface characteristics.

A further object is the provision of automatic code mark identifying or decoding apparatus adapted to insure that all of the identifying code marks applied to a board have reached the mark sensing pickup means before the permanent grade stamper or other device is operated by the decoded combination of marks on the board. Thus if boards happen to be canted out of their normal or optimum orientation or if the marks happen to be somewhat misplaced on the board, still the correct interpretation of the total code marking is assured.

An additional object is an improved lumber stamping machine or the like having a plurality of individual stamp elements and adapted for automatic selective operation in accordance with the marking and mark sensing method of the present invention.

According to method aspects of the invention as herein disclosed, as the moving boards pass an operater's station they are marked in one or more predesignated code zones, different combinations of which represent different lumber grades. The presence or absence of such marks on a board in each of the designated zones is sensed by electrically responsive pickup means stationed down the conveyor run from the operator's station in line with the respective marking zones in order thereby to actuate selectively one or more parts of a decoder circuit which correspond respectively to the code zones. The decoder circuit is arranged to select one of a number of different grade stamp actuators according to the different code combinations sensed by the decoder circuit, and is further arranged to hold the selection for a sufficient period which assures that all such responses that may be received have been received even in the case of an extremely canted board. Such holding period is terminated by operation of board-actuated means stationed further down the conveyor run for completing the energizing circuit for the particular grade stamp actuator so selected, thereby to print a permanent grade mark legibly on the board.

Invention is also considered to reside in the method of arranging the marking zones and applying the marks to the boards in such zones with the latter positionally related to the conveyor run and pickup means. In this arrangement of marking zones the different zones extend in side-by-side relationship parallel to the conveyor run, and the marks are applied as substantially straight lines extending transversely to the conveyor run across the width of one or more such zones. The line marks on any one board are preferably aligned with each other transversely to the line of conveyance for effecting substantially simultaneous operation of the respective pickup means responsive to marks in the different zones.

An important specific aspect of the method as preferably practiced herein is the use of an electrolyte as the marking medium and paired electrodes as the electrically responsive pickup means. In particular, unique advantages are obtained when these electrode elements comprise dissimilar metals which complete a voltaic cell through the mark electrolyte contacted simultaneously thereby in order to generate their own circuit operation voltages. The wet electrolyte markings may be formed by materials which leave no objectionable deposits or lasting impressions on the boards. Moreover, it has been learned that the effective ionization value of the electrolyte may be readily so selected that the voltaic cell output currents developed across the dissimilar metal electrode pairs will be sufficient to actuate the response circuit whereas normal wood acids or salts even in the case of wet boards are incapable of generating sufficient currents for falsely indicating the presence of code marks. In this regard the voltaic cell principle applied to the method is considered much superior to the principle of the electrolytically conductive cell with applied electrode voltage forcing electric current through the electrolyte marks. Also it is superior to the principle of an electrically conductive mark with graphite or other solid conductive material as the marking medium, and with voltage applied to the electrodes to pass current through the mark. A photoelectric cell with light reflective or absorptive marks or with fluorescent light producing marks are also inferior to the preferred technique described. Varying and unpredictable natural physical markings or properties of different boards or of different woods impair the reliability of these other possible marking techniques for most lumber grading applications of the invention, although these alternative techniques may apply to the general method and apparatus in other or broader aspects as herein disclosed. The method also contemplates certain preferred marking materials which enhance the reliability and practicability of the preferred marking technique. The technique has broad application in the marking of articles generally where instantaneous and reliable automatic mark detection is required for identification or control purposes.

Another feature of the invention resides in the preferred electrical pickup means comprising board tracking electrodes of dissimilar metals; in the pickup-actuated decoding circuit speecifically comprising an arrangement of holding relays with contacts arranged to form different stamp actuator selection circuits according to the different combinations of relays energized; in the combination therewith of board-actuated means preferably of the photoelectric type for initiating energization of the stamp actuator and terminating energization thereof while resetting the decoder circuit, all in timed relationship with movement of the boards; and in features of construction and operation of the preferred selectively operable grade stamp mechanism.

These and other features, objects and advantages of the invention including the particulars of those described herein will become more fully evident from the following detailed description by reference to the accompanying drawings illustrating the invention specifically applied to lumber grading.

Figure 1 is a somewhat simplified perspective view of an illustrative lumber grading installation in which the invention is employed.

Figure 2 is a simplified diagrammatic view of the arrangement of predesignated marking zones in which the code marks are applied to the boards moving on the conveyor, the view showing different code marks on a number of boards passing through the marking station.

Figure 3 is a side view, partly in section, of a suitable type of marking pencil useful in the method.

Figure 4 is a perspective view of the preferred electrically responsive pickup means by which the code marks in one zone are sensed.

Figure 5 is a sectional view of the pickup means and associated electrically responsive means timing actuation of the automatic stamping device in relation to board movement, the view being taken on line 5—5 of Figure 6.

Figure 6 is a front view of three electrically responsive pickup devices and the timing means illustrated in Figure 5, the view being taken looking in the direction opposite the direction of travel of the conveyed boards.

Figure 7 is a schematic diagram of the automatic mark sensing apparatus, the decoding apparatus, and the connections of the latter to the different stamp actuators which may be selected in accordance with various code combinations representing different lumber grades.

Figure 9 is a sectional view taken on line 9—9 of Figure 8, showing the illustrated stamping roll in retracted or elevated position.

Figure 10 is a view similar to Figure 9 in which the illustrated stamping roll is in the actuated position engaging a board.

Figure 8:
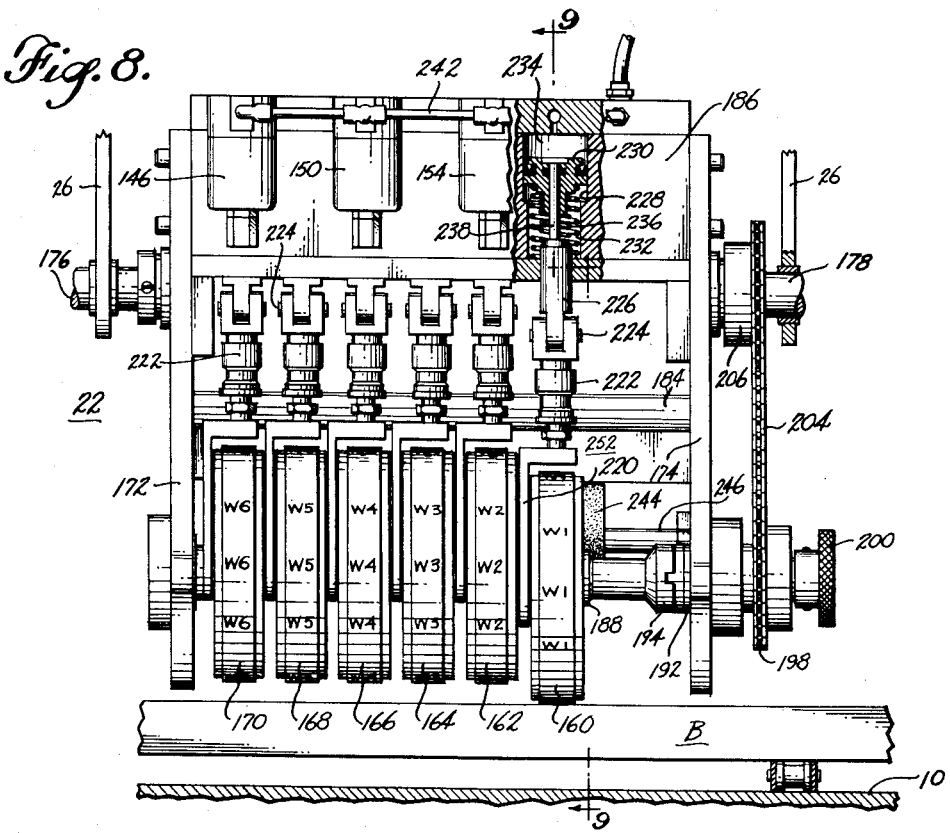
Figure 8 is a front view of the selectively operated stamping device with one of the stamp rolls in the actuated position contacting a board.

Referring to Figures 1 and 2, boards B1, B2, B3, etc., are being advanced on conveyor 10 in the direction of the arrows. This conveyor, shown as comprising a plurality of parallel chains driven and supported by sprockets, may be of any suitable type for use in a sawmill to carry the cut lumber from an initial point P to any point of disposal (not shown). In the illustrated case the boards are disposed in generally parallel relationship transverse to the line of conveyance and preferably with some spacing between successive boards. Spacing between boards ordinarily occurs in any event and is here desirable in order to allow the operator O ample time in which to judge the grade of the boards and apply the temporary grade code marking thereto as well as to permit operation of the code mark sensing means and the grade stamping device controlled thereby without any tendency of interference between boards. While means on the conveyor may be provided for accurately orienting the boards parallel, or with at least one edge parallel to corresponding edges of the other boards, more usually the boards are laid on the conveyor in a somewhat random fashion disposed generally perpendicular to the line of conveyance without special attention to accurate orientation. Consequently, some of the boards tend to be canted in either direction and by different amounts. As will later appear herein, the temporary code grade marking method and code mark sensing arrangement by which the automatic permanent grade stamper or other operating means is controlled allows for canting of the boards to any normal extent. Also such method and means allow for the possibility of the operator applying code line marks which are not precisely parallel to the length even of accurately oriented boards, or which, being drawn free-hand, may be crooked or may be canted in relation to the direction of conveyance for any reason. The technique and apparatus employed is therefore well suited for application to ordinary sawmill production conditions.

In Figure 1 the boards first pass a marking station M provided with means such as the light and shadow projector 12 by which marking zones are designated with relation to the conveyed boards for the guidance of the operator in placing temporary grade-identifying marks thereon. As shown, a plurality of shadow lines Ia, Ib, IIa, IIb, etc., are projected onto the conveyor face and any boards supported thereby moving through the marking station M. These shadow lines define marking zones I, II, etc., extending side by side in parallel relation to the line of conveyance. In the illustration three marking zones I, II, and III are defined by the respective pairs of shadow lines, Ia—Ib, IIa—IIb, and IIIa—IIIb (Figure 2). These lines have sufficient length in terms of board travel along the conveyor to allow time for the operator to judge the grade of each board and apply code line marks thereto before the board passes beyond the shadow lines.

While any of various codes may be used for applying the marking lines to represent different grades of lumber, a convenient one is shown in Figure 2 wherein a plurality of boards are arranged in succession as if on the conveyor carrying the boards through the marking station, although more closely spaced than usual. The board B1 has a mark C1 in marking zone I and no marks in either of the other two zones. According to the code this marking combination may represent a first lumber grade. The next board B2 is shown as having a single mark C2 in zone II, representing the code combination for a second grade. Similarly the board B3 has a single mark C3 in zone III, representing a third grade. A fourth grade is represented on the next board B4 by the presence of line marks across zones I and II, either as separate lines across each such zone or a continuous line mark drawn to span across both zones and any intervening space as shown. In similar manner board B5 is marked in both zones II and III and not in zone I, to designate a fifth grade, whereas board B6 is marked in all three zones to designate a sixth grade. If a seventh grade is to be represented it may be marked as shown by dotted lines in the case of board B7, wherein marks appear in both zones I and III but not in zone II. Preferably from the standpoint of convenience and reliable operation of the disclosed grading system the marks constitute substantially straight lines which extend transversely to the direction of conveyance and in the case of marks appearing in more than one zone extend in general alignment with each other. Inasmuch as these marks are ordinarily drawn freehand, perfect alignment and perfect straightness of the line marks is not possible; however, this is not necessary with the disclosed system and apparatus, as previously mentioned. According to an important feature of this invention these line marks are made with electrolyte liquid which is preferably colorless and transparent.

As the marked boards advance down the conveyor from the marking station they pass a sensing station E formed by a plurality of electrically responsive pickup devices, such as the devices 14, 16 and 18. These devices are arranged abreast of each other respectively in alignment with the different marking zones so that any marks appearing on the boards in the different zones pass directly beneath or in contact with the respective pickup devices to be sensed thereby. The function of the pickup devices is to sense the presence or absence of temporary grade marks in the different zones on each individual board and feed the resultant electrical responses to a decoding apparatus 20 controlled thereby. The decoder is adapted for converting the different combinations of responses of the pickup devices into selective control operations by which, in this case, different grade stamp actuators of an automatic stamping device 22 are selected for application of permanent grade stampings to the individual boards. The automatic grade stamper 22, which operates without interruption of board movement, is located preferably a short distance down the conveyor run from the pickup devices and in the illustration for convenience is offset somewhat therefrom transversely of the line of conveyance. In Figure 1 board B1 has received the permanent grade impression W1 from the stamper 22. Obviously the sensing apparatus and stamping apparatus may assume different forms in broad aspects of the invention and may be mounted in different positions and in different ways in relation to the conveyance apparatus.

The preferred marking technique and mark sensing technique for application to lumber grading, as previously mentioned, involves use of electrolyte marking medium and pairs of sensing electrodes adapted to bear against the board surfaces for detecting such marks by flow of electric current. More specifically it is preferred in the case of lumber grading that the flow of current indicating the presence of a temporary mark occur by voltaic cell action taking place between dissimilar metal electrodes engaging the wet mark electrolyte.

A preferred example of a suitable electrolyte consists of a solution of ammonium sulfate, preferably of a concentration providing maximum ionization, with certain additives. One preferred additive is potassium aluminum sulfate (alum) which has the effect of hardening the surface of the board to which the electrolyte is applied so that the board will not quickly or immediately absorb the electrolyte to impair the reliability of the system. It is also found that in some way the hardener materially increases ionization of the solution between electrodes. Addition of a thickener such as guar gum or methyl cellulose also aids in prolonging the active presence of the applied electrolyte on a board. Another additive which is usually desirable is a suitable detergent which cuts any surface oils on the board and thereby insures a uniform marking or wetting of the board surface. Preferably the marking electrolyte is colorless and clear, leaving no residues or impressions on the board which would mar the appearance of high grade lumber. A preferred formulation is as follows: 1,000 cc. water, 42 gm. ammonium sulfate, 30 gm. potassium aluminum sulfate, 5 cc. of a suitable liquid detergent such as "Aerosol-Y" by the Eastman Company. Various other electrolytic solutions or concentrations of the specific solution may also be used. Even a simple and comparatively weak electrolyte such as a saline solution may be used if the article surface is itself unlikely to be electrolytically conductive to an appreciable degree. An example of such a situation is kiln dried lumber having no surface moisture. For most applications the electrolyte obviously should not be toxic or harmful to personnel nor permanently affect the appearance of the articles marked.

The following are additional specific formulations of suitable electrolyte solutions, the listing being by no means exhaustive but tending to indicate the wide range of choices of inexpensive, readily obtained electrolytes that are available for practicing the invention. It will be recognized that some of the listed formulas, particularly those lacking a hardener (such as alum) and a wetting agent (such as a detergent) are less satisfactory than others or have more limited application. The thickeners are usually optional, especially if an alum hardener is used to prevent too rapid absorption of the liquid into the wood and the detection process occurs very shortly after the articles receive the electrolyte markings.

*Solution No. 1*

32 parts ammonium sulfate
25 parts potassium alum
1000 parts water
10 parts guar gum
5 parts "Photoflow"[1] detergent

[1] Trademark of The Eastman Company, Rochester, N.Y.

The two salts were dissolved in water. The guar gum was then added and the mixture stirred for an hour. One hour later the detergent was added.

Solution No. 2

32 parts ammonium sulfate
25 parts potassium alum
2000 parts water
10 parts guar gum
5 parts "Photoflow" detergent The solution was prepared in the same manner as Solution No. 1.

Solution No. 3

32 parts ammonium sulfate
25 parts potassium alum
4000 parts water
20 parts guar gum The solution was prepared in the same manner as Solution No. 1, except for the detergent which was not added.

Solution No. 4

30 parts sodium chloride
1000 parts water

The sodium chloride was dissolved in the water and the solution used as is.

Solution No. 5

A saturated solution of sodium chloride was prepared by adding 400 parts of the salt to 1000 parts of water and boiling. The solution was allowed to cool to room temperature before use.

Solution No. 6

32 parts ammonium sulfate
25 parts potassium alum
1000 parts water

The solution was prepared in the same manner as Solution No. 1, except that no thickener or wetting agent was added.

Solution No. 7

50 parts manganese sulfate monohydrate
1000 parts water
5 parts guar gum

Solution prepared in the same manner as Solution No. 1, except that no wetting agent was added.

Solution No. 8

32 parts ammonium sulfate
25 parts potassium alum
2000 parts water
20 parts methyl cellulose
10 parts "Photoflow" detergent The two salts were dissolved in the water. Approximately ⅓ of the solution was heated to 85° C. and the methyl cellulose added to this portion. This mixture was stirred for 5 minutes and then added to the previously cooled (8° C.) remaining ⅔ of the solution. The entire solution was stirred for about 1 hour at which point the detergent was added. The solution was then used as is.

Solution No. 9

50 parts manganese sulfate monohydrate
1000 parts water
5 parts guar gum
5 parts "Photoflow" detergent This solution was prepared in the same manner as Solution No. 1.

Solution No. 10

32 parts ammonium sulfate
25 parts potassium alum
2000 parts water
20 parts methyl cellulose This solution was prepared in the same manner as Solution No. 8, except that no detergent was added.

Solution No. 11

32 parts ammonium sulfate
25 parts potassium alum
1000 parts water
10 parts guar gum
5 parts 2 amino-2 methyl-1 propanol wetting agent This solution was prepared in the same manner that Solution No. 1 was prepared.

Solution No. 12

100 parts calcium nitrate tetrahydrate
900 parts water
20 parts guar gum

The solution was prepared in the same manner that Solution No. 1 was prepared.

Solution No. 13

100 parts calcium nitrate tetrahydrate
900 parts water
20 parts guar gum
25 parts "Photoflow" detergent The solution was prepared in the same manner as Solution No. 1 was prepared.

Solution No. 14

25 parts manganese sulfate monohydrate
1000 parts water

The salt was dissolved and the solution used as is.

Solution No. 15

25 parts manganese sulfate monohydrate
1000 parts water
10 parts guar gum

The solution was prepared in the same manner that Solution No. 1 was prepared, except no wetting agent was added.

Solution No. 16

50 parts calcium nitrate tetrahydrate
1000 parts water
5 parts methyl cellulose

The solution was prepared in the same manner that Solution No. 8 was prepared.

Solution No. 17

25 parts manganese sulfate monohydrate
1000 parts water
5 parts guar gum
10 parts 2 amino-2 methyl-1 propanol Solution prepared in the same manner that Solution No. 1 was prepared.

Solution No. 18

25 parts manganese sulfate monohydrate
10000 parts water
5 parts guar gum
10 parts "Lux"[1] liquid detergent

[1] Trademark of Lever Brothers, Inc., New York.

Solution prepared in the same manner as Solution No. 1.

Solution No. 19

50 parts calcium nitrate
1000 parts water
5 parts methyl cellulose
10 parts "Lux" liquid detergent Solution prepared in same manner as Solution No. 8.

Solution No. 20

32 parts ammonium sulfate
25 parts potassium alum
1000 parts water
10 parts guar gum
5 parts "Photoflow" detergent Solution prepared in the same manner as Solution No. 1.

Solution No. 21

32 parts ammonium sulfate
25 parts potassium alum
2000 parts water
20 parts guar gum
10 parts "Photoflow" detergent The solution was prepared in the same manner as Solution No. 1.

Solution No. 22

32 parts ammonium sulfate
25 parts potassium alum
2000 parts water
20 parts methyl cellulose
10 parts "Photoflow" detergent Solution prepared in the same manner as Solution No. 8.

Figure 3 illustrates a suitable pencil for applying the electrolyte line marks. This comprises an elongated tubular reservoir 34 having a closure plug 36 at one end and tapered at its opposite end 38 to pass a marking wick 40 which extends up into the body of the container for saturation with marking electrolyte 42.

Referring to Figures 4 to 7, inclusive, the preferred sensing electrodes comprise dissimilar metal elements. As shown, pickup 14 comprises nonrotary dissimilar metal disk electrodes 14a and 14b. These disks are locked against rotation, so as to slide on the board's surface and thereby assure good electrical contact with wet electrolyte marks thereon. These disks may be rotated to new positions as a surface area becomes worn. Pickup devices 16 and 18 have similar electrodes. Referring to the pickup device 14, to which the others are similar, the electrode 14a is mounted on a horizontal pin 44 projecting laterally from the end of an elongated supporting arm 46. The upper end of this arm is apertured and mounted on a collar 48 rotatably supported on a fixed pivot shaft 50 which extends horizontally between the sides of the bracket 24 transversely of the conveyor and serves as a common support for all of the pickup arms. Bracket 24 is mounted on a cross-beam 28 carried by posts 30 and 32. A helical spring 52 surrounding the shaft 50 between the arm 46 and the next adjacent arm has one end anchored to the shaft and its opposite end anchored to the collar 48. The spring is loaded in a sense to urge the arm 46 downwardly. The lower, horizontal portion of the bracket 24 stops the arm in an inclined position as shown in Figure 5, trailing in relation to the direction of travel of boards B on the conveyor 10. The second electrode 14b is mounted in closely spaced relation to electrode 14a on a shaft 54. Shaft 54 is carried by the lower end of a relatively short arm 56 the upper end of which is pivotally supported on a shaft 58 projecting from the arm 46 in parallel relation to the shafts 44 and 54. The shaft 58 is nonrotationally held in the arm 46. A spring 60 encircling the projecting end of the shaft 58 is anchored at one end on such shaft and at its opposite end on the arm 56. The spring is designed to urge the arm 56 downwardly. It has a stop 61 positioning electrode 14b normally slightly below electrode 14a. Because of the freedom of the two arms to swing together and relatively both electrodes always trail in contact with the surface of a passing board despite surface irregularities or slope. The relatively thin and closely spaced dissimilar metal disks 14a and 14b are respectively mounted on insulating wheels 14a' and 14b', the peripheries of which are set back slightly from the peripheral edges of the electrode disks to permit the latter to contact the board surface without interference from the insulating disks carrying them. Connecting elements 62 and 64 are electrically connected to the electrode disks 14a and 14b, respectively, and are connected by conductive leads 66 and 68 to the decoder circuit to be described. Examples of dissimilar metals useful in each electrode pair are magnesium and silver, comprising metals widely separated from each other in the electromotive series so as to yield maximum potential differences between the electrodes in an electrolyte medium by the voltaic cell effect.

In almost every one of the above-listed electrolyte formulas the magnesium-silver electrode combination yielded greatest sensitivity to the electrolyte markings. However, any of various metal combinations may be used, with varying success. The following chart illustrates the effect with other electrode metal combinations for the solutionss listed, although these metal combinations are not the only ones that may be used. The chart values represent relative values of current developed through a resistance of given size by electrodes placed in the different electrolytes under standardized conditions.

| Solution | Mg-Ag | Mg-Cu | Mg-Fe | Zn-Ag | Zn-Cu | Zn-Fe |
| --- | --- | --- | --- | --- | --- | --- |
| 1 | 220 | 220 | 200 | 80 | 120 | 80 |
| 2 | 200 | 220 | 180 | 100 | 90 | 60 |
| 3 | 160 | 140 | | | | |
| 4 | 180 | 220 | 60 | | 140 | |
| 5 | 240 | 240 | | 240 | | |
| 6 | 260 | 220 | | | 140 | 100 |
| 7 | 180 | 180 | 140 | 100 | 110 | 70 |
| 8 | 220 | 220 | 170 | 180 | 160 | 110 |
| 9 | 240 | 220 | 160 | 140 | 140 | 120 |
| 10 | 200 | 180 | 150 | 120 | 120 | 100 |
| 11 | 200 | 200 | 180 | 160 | 140 | 120 |
| 12 | 220 | 240 | 200 | 160 | 160 | 120 |
| 13 | 220 | 240 | 220 | 200 | 200 | 140 |
| 14 | 140 | 110 | 120 | 100 | 140 | 90 |
| 15 | 150 | 120 | 110 | 100 | 110 | 90 |
| 16 | 220 | 200 | 220 | 160 | 150 | 160 |
| 17 | 150 | 130 | 120 | 120 | 120 | 80 |
| 18 | 140 | 130 | 110 | 110 | 100 | 100 |
| 19 | 200 | 220 | 200 | 180 | 200 | 120 |

In order to illustrate concretely how effective is the present method of retecting electrolyte code marks on lumber, for example, without producing false responses from wood moisture, the following table shows test results with wet veneer. The table illustrates the results achieved with different dissimilar metal electrode combinations with unmarked Douglas fir veneer in the wet or green state and the same veneer bearing marks with different electrolyte solutions as described above.

| Electrode | Solution 20 | Solution 21 | Solution 22 | Wet Veneer |
| --- | --- | --- | --- | --- |
| Mg-Ag | 260 | 240 | 240 | 30 |
| Mg-Cu | 240 | 240 | 240 | 20 |
| Mg-Fe | 230 | 220 | 200 | 20 |
| Zn-Ag | 180 | 140 | 160 | 20 |
| Zn-Cu | 200 | 180 | 160 | 30 |
| Zn-Fe | 120 | 110 | 80 | 10 |

In Figure 7, the pairs of electrodes are shown connected to energize transistor amplifiers. Thus, the electrodes 14a and 14b are respectively connected to the emitter and base of transistor 70 through a variable resistance 72. The electrodes 16a and 16b are similarly connected to a transistor 74 and variable resistance 76, while electrodes 18a and 18b are similarly connected to a transistor 78 and variable resistance 80. A conductor 82 interconnects the ends of the variable resistance windings not traversed by the electrode voltaic cell currents.

The transistor collector circuits receive energy from a power supply comprising transformer 84, rectifier 86, and filter condenser 88. The transformer primary is connected to the A.C. input terminals 85 through a normally open master power switch 90. The rectified output from transformer 84 is impressed across the windings of the potentiometer 92, one side of which is grounded at 94. The adjustable wiper of the potentiometer is connected by conductor 95 to one side of the windings of each of relays 96, 98 and 100. The opposite side of the winding of relay 96 is connected to the collector of transistor 70, whereas that of relay 98 is connected to the collector of transistor 74 and that of relay 100 is connected to the collector of transistor 78. Condensers 102, 104 and 106 are respectively connected across the windings of the relays 96, 98 and 100. These condensers are charged during the brief instant transistor collector current flows when electrolyte marks on a board bridge the electrode pairs associated with the respective associated transistors. Subsequent discharge of any such condenser through its relay coil holds the relay in its actuated condition for a period sufficient to cause actuation of the associated power relay 108, 110 or 112 despite the brevity of transistor collector current flow. Conductor 82 is grounded to complete the collector power supply circuit. Rectifiers 83a and 83b, 85a and 85b, and 87a and 87b connected in the winding leads of the respective sensing relays 96, 98 and 100 prevent transistor damage by flow of reverse collector current therein from the inductive reactance of the associated sensing relays upon termination of transistor conductivity.

The windings of power relays 108, 110 and 112 are respectively connected to be energized by actuation of the contacts of the sensing relays 96, 98 and 100. While these power relays may be operated by direct current, they are shown as being connected for operation by alternating current derived from input terminals 85. One input terminal 85 is connected by a conductor 118 to the movable contactor of each of the three sensing relays 96, 98 and 100. The normally disengaged contact 96a of relay 96 is connected to one side of the winding of power relay 108 through a conductor 120. The corresponding contacts 98a and 100a of sensing relays 98 and 100, respectively, are connected through the respective conductors 122 and 124 to one side of the windings of power relays 110 and 112. The opposite sides of the windings of the three power relays are connected by common conductor 126 to the opposite input terminal 85, thereby permitting completion of an energizing circuit for any of the power relays by closure of the normally disengaged contacts of the associated sensing relay.

Each of the power relays 108, 110 and 112 is provided with a holding circuit. However, these holding circuits are ineffective except when a board is operatively positioned in relation to the sensing apparatus. In order to detect arrival of a board at the sensing position a cadmium sulfide photoelectric cell 130 is disposed below the conveyor surface to be illuminated normally by a light source 133 located above the conveyor surface. Interruption of the light beam by an advancing board operatively conditions the code mark sensing apparatus including the decoder circuit. The cadmium sulfide cell 130 is of the photoconductive type and receives its energizing voltage from the rectifier bridge 114 through the conductor 136. This cadmium sulfide cell is connected to energize a relay 132 when it receives the light beam, and to permit such relay to open when the board interrupts the light beam. The normally disengaged contact 132a of relay 132 is connected through conductor 118 to one of the input terminals 85, whereas the movable contactor 132b of relay 132 is connected through conductor 134 to movable power relay holding circuit contactors 108a, 110a and 112a.

Stationed a short distance (less than a board's width) down the conveyor from the cadmium sulfide cell 130 is a second cadmium sulfide cell 138 arranged to be illuminated by the same light source 133. The cadmium sulfide cell 138 is connected in series with the winding of a relay 144 to energize the latter by flow of current through conductor 136 when light from source 133 falls on this cell. A first set of contacts 144a and 144b in relay 144 are engaged in the deenergized condition of relay 144 and provides a connection from the conductor 118 to the holding circuits for the power relays. Because of the relative spacing of the two cells in the direction of travel of the boards, the second cell becomes darkened by a board prior to the time the board passes beyond the first cell 130 and permits light to fall on the first cell once again. Thus, relay 144 is deenergized by the darkening of cell 138 before relay 132 is reenergized by reillumination of cell 130 during the board's passage. Consequently, reillumination of cell 130 does not immediately interrupt the holding circuits for power relays 108, 110 and 112, which remain energized until relay 144 is reenergized. Preferably the two photoconductive cells are mounted in a single casing which may be adjusted somewhat along the length of the conveyor run by turning the crank 140 (Figure 1) which drives a feed screw 142 engaging nuts (not shown) carrying the spaced cells. If desired, means for adjusting the spacing between cells may also be provided.

The purpose in providing two photocells and associated relays instead of a single cell and relay is to provide for the delayed energization of the particular grade stamp actuator in the stamping machine 22 selected by the decoder circuit. The delay interval is in terms of board movement following initial actuation of any of the power relays. It prevents operation of the wrong grade stamp actuator, only to be followed by operation of the correct actuator in case the code mark signals are not received simultaneously, which often they are not. Thus it avoids one board being marked with two or more different stamps. This delaying action is accomplished through a second set of contacts 144c, 144d in the relay 144, which are closed in the deenergized condition of the relay, representing the condition when the cell 138 is darkened by arrival of a board in stamping position relative to stamper 22. It will therefore be evident that this delay action insures that, before any stamper is actuated, all of the power relays which should be actuated by coded line marks on any board will have been actuated despite possible canting of the board or canting or crookedness of line marks applied to the board.

In the illustrated case the stamp element actuators for the stamping machine 22 comprise solenoid valves designated 146 through 156. The solenoid windings of these valves are electrically connected for selection to be energized individually in accordance with the different combinations of grade-identifying code marks which may appear on the boards. The function of the power relay circuits is to select one of the several solenoid valves for application of the appropriate permanent grade stamp to each board, and the function of the board-actuated cadmium sulfide cell 138 and relay 144, particularly the contacts 144c, 144d of such relay, is to complete the energizing circuit for the solenoid valve so selected after a predetermined delay interval.

In order to perform the decoding (i.e., stamp actuator selecting) function, one of the power relays, such as the relay 108, has one movable contactor 108b alternatively engageable with stationary contacts 108c and 108d. A second power relay, such as relay 110, has two additional movable contactors 110b and 110e each alternatively engageable with two stationary contacts. The third relay 112, besides its holding contacts, has four additional movable contacts 112b, 112e, 112h and 112k, two of which are adapted to engage alternative either of two stationary contacts, and two others of which are adapted to engage a single stationary contact in one of their alternative positions.

As will be seen from Figure 7 the decoding combinations for operating the respective solenoid valves designated 146 through 156 are as follows. Valve 156 is selected by energization of all three power relays 108, 110 and 112. The energizing circuit for solenoid valve 156 includes conductor 156, the winding of solenoid of valve 156, relay contacts 112n, 112k, relay contacts 110g, 110e, relay contacts 108d, 108b, relay contacts 144c, 144d, and alternating current conductor 118.

Similarly solenoid valve 154 is selected only by energization of the power relays 110 and 112. The energizing circuit for this valve's solenoid includes the conductor 158, the valve solenoid itself, the relay contacts 112g, 112e, relay contacts 110d, 110b, relay contacts 108b, 108c, relay contacts 144c, 144d, and conductor 118.

Similarly solenoid valve 152 is selected solely by energization of power relays 108 and 110. Likewise, solenoid valve 150 is selected for actuation by energization solely of power relay 112; whereas solenoid valve 148 is selected for actuation solely by energization of power relay 110. Relay 146 is selected for actuation solely by energization of power relay 108.

After the board advances along the conveyor past the cadmium sulfide cell 138 the latter is reilluminated, thereby reenergizing its relay 144 and interrupting the holding circuits for the power relays 108, 110 and 112 as well as interrupting the energizing circuit for the particular stamping device solenoid valve previously selected and energized, thereby completing the cycle of operation of the decoding and stamp actuating apparatus.

In order to permit continuous and uninterrupted movement of the boards on the conveyor 10 while performing the various operations connected with the grading procedure, particularly the stamping operation, the stamping elements comprise driven rollers. In the example these are designated 160, 162, 164, 166, 168 and 170. The periphery of each roller has a different grade stamp mark thereon repeated a number of times around its extent so that a board moving along the conveyor and contacted by one of the stamp rollers will assuredly receive one and usually more impressions of the grade designation thereon. Moreover these stamp rollers are preferably rotatively driven at a peripheral speed which substantially equals the lineal speed of travel of the conveyed boards so as to avoid smudging of the grade stamp marks due to difference in speed of the stamp roller surface and the board surface contacted thereby. The stamp rollers are arranged in side by side relationship extending in series transversely of the conveyor run in a mechanical arrangement which permits the rollers to be positioned as closely together as possible so that the relative position of the permanent grade stamp designations will be about the same on boards of different grades.

As previously indicated certain additional features of the invention reside in the mechanical construction of the stamping device permitting of such a compact arrangement of driven roller elements adapted for selective actuation in accordance with the decoded mark combinations derived by the decoder circuit. Referring particularly to Figures 1, and 8 to 11, inclusive, the stamping device is mounted on and between the transversely spaced suspension brackets 26 carried by cross-beam 28. Side plates 172 and 174 supporting the operating mechanism of the stamper are pivotally mounted on a through shaft 176 carried by the brackets 26. The shaft 176 also serves as a drive shaft for transmitting rotation to the stamp rollers. The central axis of the shaft 176 extends transversely of the conveyor run at a location materially above the height of boards supported on the conveyor, and the general depending structure of the stamper is such that the stamper is inclined downwardly in the direction of conveyance. The entire structure may be raised and lowered by swinging about its pivotal support shaft. Such adjustments may be effected by means of a screw 180 threaded in a tab 181 fixed on the bracket 26, said screw being adapted to bear against a stop 182 fixed on the frame plate 172 and thereby limit downward swinging of the unit. Adjustment of the screw raising and lowering the stamper frame in relation to the conveyor surface enables the stamper to accommodate boards of different thickness being run by the mill at different times.

The frame plates 172 and 174 are maintained in fixed parallel relationship by a tie member 184 and by the upper frame assembly 186. The latter also serves as a cylinder block for air actuators, and as a support for the solenoid valves 146, 148, etc., controlling delivery of pressurized air to such actuators.

Figure 11:
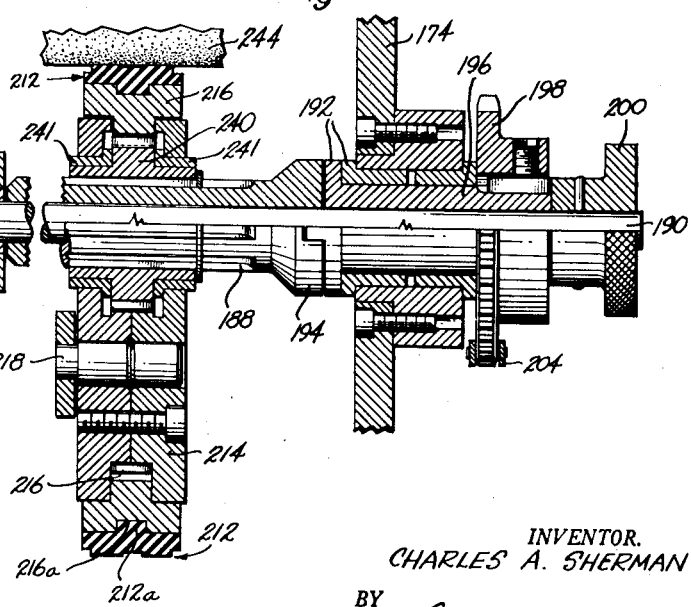
Figure 11 is an enlarged sectional detail view taken on line 11—11 in Figure 9 to illustrate mechanical details of the stamping machine.

A hollow, externally splined power drive shaft 188 extends horizontally between the lower portions of the frame sides 172 and 174. As shown in Figure 11, the frame plate 172 is provided with journal elements 189 supporting one end of the core shaft 190 which extends axially through shaft 188 to support the latter for rotation. Journal elements 192 support the opposite end of the core shaft 190. The splined shaft 188 rotatively encircling the core shaft 190 carries one element of a toothed clutch 194. The cooperating element of this clutch is carried by a sleeve 196 comprising an extension of shaft 188 and also encircling core shaft 190. A retraction knob 200 locked to the core shaft 190 permits removal thereof for disassembly of the unit. A detent ring 202 holds the core shaft in its normal position. The sleeve 196 carries a sprocket 198 engaged by a drive chain 204 which encircles a sprocket 206 on transmission shaft 176. The transmission shaft 176 is driven by a chain and sprocket drive 210 (Figure 1). The latter in turn is driven by or with the conveyor elements to insure synchronization of the conveyor and the stamp rollers.

Each stamp roller is formed and operated as a separate unit although supported in a common frame and driven rotationally by a common shaft 188. Each stamp roller comprises a ring gear 216 carrying a peripheral stamp ring 212 formed of rubber or other suitable material. The stamp ring is stretched over the periphery of gear 216 and is held in place thereon by reception of an inside rib 212a on the stamp ring in a groove 216a formed in the peripheral surface of the ring gear. The ring gear 216 is journalled for rotation on the two-part plate or disk 214. The stamp roller 160, to which the other rollers are similar, is provided with an eccentric element 218 by which it is pivotally supported on the lower end of a depending supporting arm 220. This L-shaped arm has an upward extension fitting 222 pivotally connected at 224 to a rod 226. The latter extends into the air-actuator cylinder 228 for connection to an actuating piston 230 therein. A helical spring 232 acts upwardly against the piston for holding the arm, hence the stamping roller 160 normally in an elevated position. A guide rod 238 secured to the piston is encircled by a cushioning spring 236 and slides in a central bore in the rod 226. Means are provided (not shown) by which relative retraction of the guide rod 238 from the bore in rod 226 is limited, so that recoil of return spring 232 will not only raise the piston but will also raise the arm 220 and stamp roller 160 when air pressure in cylinder space 234 is reduced. Admission of air under pressure into the space 234 above the piston urges the stamping roller downwardly into operative position of contact with a board B as shown in Figure 8. The cushioning spring 236 transmits this actuating force and permits the stamp roller to yield upwardly in order to ride over a board and apply a suitable preset value of stamping pressure thereon. Admission and evacuation of air into and from the cylinder spaces for actuation of the stamping rollers is controlled by the solenoid valves. Air under pressure is delivered to these valves through suitable conduits 242. The cylinders may be vented to atmosphere for permitting the return stroke of each actuator.

In order to drive the stamp roller rotationally while permitting it to be raised and lowered by the arm 220 under the limited space conditions imposed a pinion gear 240 is carried by splined shaft 188 within the annular plate 214. The pinion engages the ring gear 216. The pinion is journalled in plate structure 214 by slide sleeves 241. Thus rotation of shaft 188 produces rotation of each stamping roller 160. In addition, since the plate members 214 are journalled on sleeves 241 each such stamping roller is free to revolve bodily about the eccentric axis of shaft 188 in order to permit actuation movements of the driven stamp rollers.

One reason for continuously driving the stamping rollers even in their retracted position is to insure a uniform coating of printing ink thereon preparatory to actuation of any such roller. For this purpose any suitable inking device may be provided. That shown comprises a felt roller 244 journalled on a free shaft 246 carried by sliders 248. The latter are mounted to slide in inclined guide ways 250 in the respective frame plates 172 and 174 such that the force of gravity and vibrations in the stamping machine maintain the inking roller 244 in contact with the stamp rollers in their retracted position. An ink reservoir 252 is provided above the felt roller 244 in order to drip ink thereon at a controlled rate.

It will be evident, therefore, that the disclosed method and apparatus enable lumber grade stamping to be performed more satisfactorily and efficiently than heretofore and that certain principles of the method and apparatus may be applied to advantage in other applications, in lumber mills and elsewhere.

I claim as my invention:

1. The method of marking an article having a non electrical conducting surface and detecting the mark thereon, comprising the steps of applying to such article a mark comprising an electrolyte liquid, and while such mark electrolyte is still in an ionizable state placing a pair of electrodes of dissimilar metals in contact with the marked article at the location of such mark under electrical conditions in which electric current is generated by application of the electrodes to and flows through the mark electrolyte between such electrodes, thereby to detect the presence of such mark.

2. The method defined in claim 1, wherein the article comprises a wood and the electrolyte effective ionization differs materially from that of any surface liquids encountered in and on such wood.

3. The method defined in claim 1, wherein the electrolyte comprises a colorless material leaving no permanent appreciably visible impression or deposit on the wood.

4. A method of identifying articles having non-electrical conducting surfaces in transit along an established line of conveyance, said method comprising applying marks to such articles in predesignated zones extending side by side in parallel relation to the line of conveyance, each such zonal mark thus applied to an article comprising an electrolyte liquid, and the combination represented by the number and location of zones in which such marks are applied to any one article comprising a code combination for identifying such article, and identifying such articles at a relative location down the line of conveyance by electrically sensing on each article the presence or absence of marks in the different zones by flow of electric current through the mark electrolyte between electrodes of dissimilar metals placed in contact with the article in each such zone and decoding the combination thereof at a location down the line of conveyance to produce an electrical response therefrom and selectively operating a means by said electrical response for performing a predetermined operation on said articles.

5. The method of operating selectively operable grade stamping means for permanently grade stamping boards in transit along an established line of conveyance generally transverse to the lengths of the boards with possible canting of different boards variously, said method comprising applying line marks to such boards in predesignated zones extending side by side in parallel relation to the line of conveyance, each such zonal mark thus applied to a board extending transversely to the line of conveyance and generally in alignment with any other such line marks on the same board and comprising an electrolyte liquid, the combination represented by the number and location of zones in which such line marks are applied to any board comprising a temporary code representation of the grade of the board, sensing the presence and absence of line marks in the different zones on the board by flow of electric current through the mark electrolyte between electrodes of dissimilar metals placed in contact with the article in each such zone and decoding the combination thereof at a relative location down the line of conveyance to produce a grade-identifying electrical response therefrom, and selectively operating the grade stamping means by said electrical response for applying a permanent grade stamp marking to the board.

6. The method defined in claim 5, and the additional step of delaying operation of the grade stamping means by a predetermined interval of travel of the board after the sensing of line marks thereon to insure the sensing of all such line marks present on a board which is canted or the line marks on which are canted.

7. Apparatus for identifying boards and performing selective operations with respect thereto in accordance with such identification, comprising means for moving said boards individually disposed thereon generally transversely to the line of conveyance, means stationed along said line of conveyance designating a plurality of marking zones extending in side by side relationship substantially parallel to the line of conveyance, whereby identifying marks may be placed on the articles by marking the same in one or more zones according to different identifying code combinations, a plurality of pickup devices stationed substantially abreast of each other down the conveyor from the said zone-designating means, with the pickup devices substantially aligned with the respective zones, said pickup devices being adapted to produce electrical responses from such zonal marks on a board passing said pickup devices, selectively operable means adapted to apply any of different grade stampings to the boards which pass said pickup devices in accordance with the different grade-identifying code mark combinations, and board-actuated means operable to initiate operation of the grade stamping means by predetermined advance of each board beyond the location thereof for first producing a response in a pickup device, thereby to insure production of similar responses from all of the code marks on a board before operation of the stamping means.

8. The apparatus defined in claim 7, adapted for application to marking of the boards by electrolyte liquid, wherein the pickup devices comprise pairs of dissimilar metal electrodes adapted to bear against a board surface for passage of current between the members of the pairs generated voltaically in the electrolyte marks applied to the boards in the respective marking zones.

9. In apparatus for identifying articles by code markings thereon in selected predesignated parallel marking zones, conveyor means for advancing such articles along an established line of conveyance parallel to said marking zones, a plurality of electrically responsive pickup devices stationed relatively down the line of conveyance respectively in alignment with the different marking zones to produce electrical responses from marks in the respective zones on an article passing said devices, a plurality of relays, each having holding contacts and being connected for operation by the responses of the respective pickup devices, said relays including additional contacts, a plurality of different operation-performing devices electrically energizable selectively to perform particular operations with respect to articles advancing on said conveyor means, circuit means electrically connecting said operation-performing devices to additional contacts of said relays such that operation of different relays and combinations of relays produces energization of different operation-performing devices, respectively, and means connected in circuit with the additional contacts and delaying energization of the latter devices for a period following the initial response of such pickup devices, thereby insuring receipt of pickup responses from all marks applied to an article before the selected operation-performing device is energized.

10. The apparatus defined in claim 9, wherein the delaying means comprises a light source, a photocell disposed for illumination by said light source and for interruption of such illumination by movement of an article through a predetermined series of positions on the conveyor, and means arranged for actuation by a change of illumination of the photocell, said latter means being connected for normally holding open any energizing circuits for the operation-performing devices selected by the relays, and for completion of any such energizing circuits upon such actuation of said latter means.

11. The apparatus defined in claim 10, wherein the conveyor means is adapted to convey boards as the articles, and the operation-performing devices comprise electrically energized actuators, and a plurality of different lumber grade stamp elements arranged for actuation by the respective actuators for printing lumber grade stampings selectively on the boards in accordance with the different code mark combinations thereon.

12. The apparatus defined in claim 9 for application to code marks comprising electrolyte liquid, wherein the pickup devices comprise dissimilar metal electrode pairs, each pair being adapted to form a voltaic cell with the electrolyte mark liquid, and amplifier means responsive to the voltaic outputs of the respective pairs of electrodes and connected for energizing the respective relays.

13. The apparatus defined in claim 12, wherein the dissimilar metal electrodes comprise slider electrodes, an elongated pivotally supported arm supporting one such slider electrode of each pair to track on articles moving past the same on the conveyor, a shorter arm pivotally mounted on such elongated arm and supporting the other electrode of the pair closely adjacent the first electrode and to track on such article, free pivoting of the elongated arm and relative pivoting of the shorter arm thereon permitting such electrodes to ride in uniform contact with the article surface despite slope or irregularities of such surface.

14. The apparatus defined in claim 9, adapted for grade stamping lumber articles, wherein the operation-performing devices comprise different grade stamp actuators, and a plurality of different grade stamp rollers respectively adapted for application to the lumber articles by energization of said actuators, said rollers having grade-identifying printing surfaces extending peripherally therearound, said grade stamp actuators including means rotationally supporting the respective rollers separately in parallel side by side relationship extending in series transversely to the line of conveyance, said supporting means being reciprocatively actuatable to move said stamp rollers from normal retracted position into operative position held in contact with an article surface.

15. In lumber grading apparatus, a selectively operable grade stamper comprising a plurality of different grade stamp rollers having grade-identifying printing surfaces extending peripherally therearound, means including separate grade stamp supporting means including a support arm rotationally supporting the respective rollers in parallel side by side relationship extending in series, said supporting means being reciprocatively actuatable to move said stamp rollers from normal retracted position into operative position held in contact with an article surface, fluid actuated means operatively connected to the respective supporting means and controllable for urging said stamp rollers into operative position selectively, a return spring for each such stamp roller support means, a separate cushioning spring interposed between each such support means and the fluid-actuated means thereof, thereby permitting yielding of any such stamp roller toward retracted position under impact of a board independently of actuating fluid pressure while permitting such stamp roller to roll upon a board's surface for printing purposes.

16. The grade stamper defined in claim 15, wherein the stamp rollers individually comprise a hollow stamp-carrying annular member, plate means on which said annular member is journaled for rotation, means at an eccentric location on said plate means pivotally connecting the same to the supporting arm for the stamp roller, internal ring gear means carried by and within said annular member, a drive pinion engaging such ring gear, and a drive shaft extending through all of the aligned annular members and carrying the respective drive pinions, said plate means being journalled on said drive shaft to revolve about the same, driven rotation of said drive shaft rotating said annular members synchronously while permitting the same to be reciprocated independently between retracted and operative positions, permitted by pivoting of said plate means about said drive shaft, said supporting arms connections permitting the ends thereof pivotally connected to the respective plate means to swing in an arc about said drive shaft to permit such reciprocation.

17. An article stamper adapted for operation in conjunction with an article conveyor, comprising a plurality of different stamp rollers having external peripheral stamp elements thereon, support means including individual support arms for positioning the rollers in parallel side by side relationship, means for reciprocating said support arms independently and adapted for moving individual rollers selectively between retracted position and operative position to roll upon an article for stamping the same, the stamp rollers individually comprising a hollow stamp-carrying annular member, plate means on which said annular member is journalled for rotation, means at an eccentric location on said plate means pivotally connecting the same to the supporting arm for the stamp roller, internal ring gear means carried by and within said annular member, a drive pinion engaging such ring gear, and a drive shaft extending through all of the aligned annular members and carrying the respective drive pinions, said plate means being journalled on said drive shaft to revolve about the same, driven rotation of said drive shaft rotating said annular members synchronously while permitting the same to be reciprocated independently between retracted and operative positions, permitted by pivoting of said plate means about said drive shaft, said supporting arms connections permitting the ends thereof pivotally connected to the respective plate means to swing in an arc about said drive shaft to permit such reciprocation.

References Cited in the file of this patent
UNITED STATES PATENTS

| | | |
|---|---|---|
| 646,101 | Simpson | Mar. 27, 1900 |
| 2,157,980 | Daubmeyer | May 9, 1939 |
| 2,251,742 | Kline | Aug. 5, 1941 |
| 2,302,033 | Johnson | Nov. 17, 1942 |
| 2,420,336 | Orchard | May 13, 1947 |
| 2,462,145 | Thomas | Feb. 22, 1949 |
| 2,480,490 | Mark | Aug. 30, 1949 |
| 2,506,478 | Wright | May 2, 1950 |
| 2,593,252 | Booth | Apr. 15, 1952 |
| 2,719,629 | Robinson | Oct. 4, 1955 |
| 2,821,821 | Yen | Feb. 4, 1958 |

OTHER REFERENCES

"Printing Inks" (Carleton Ellis), published by Reinhold Publishing Corp., 330 West 42nd St., New York, N.Y., 1940 edition.